July 7, 1964  V. M. BARNES, JR., ETAL  3,139,794
LAUNCHER AND ROCKET

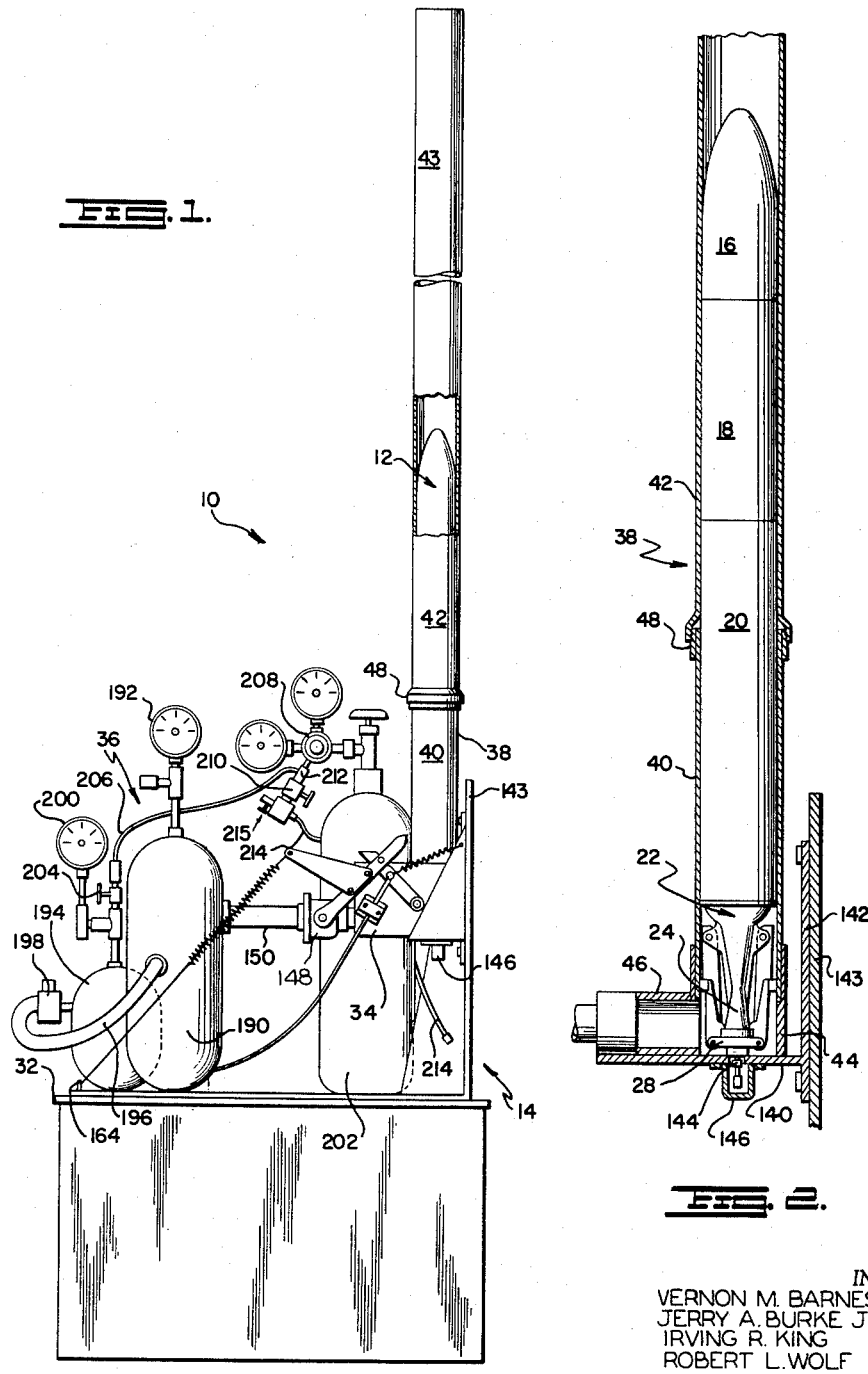

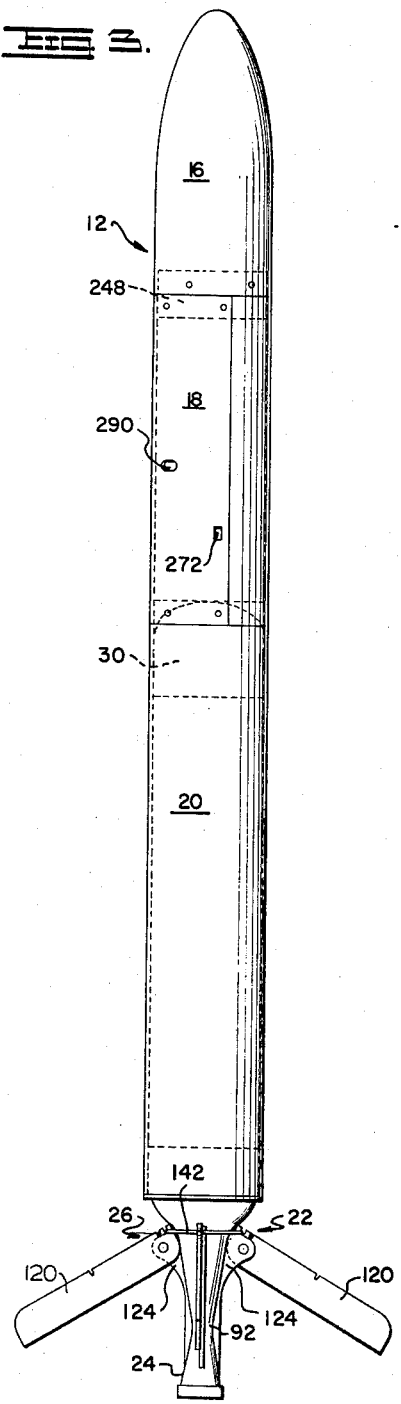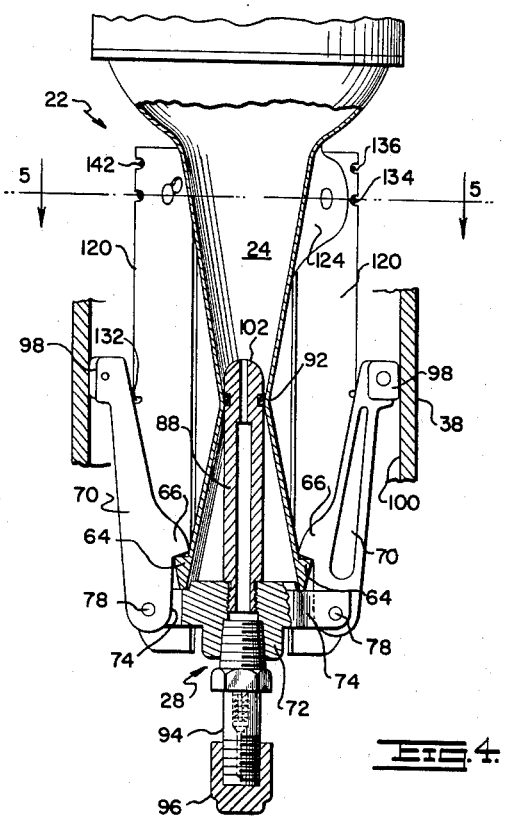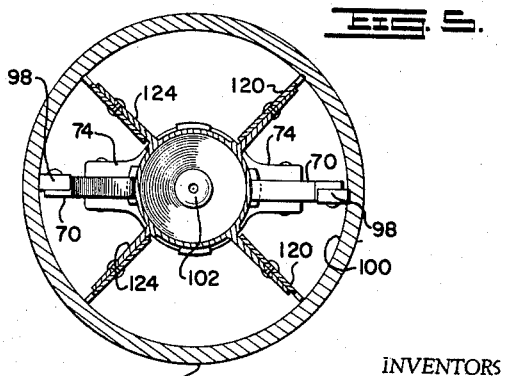

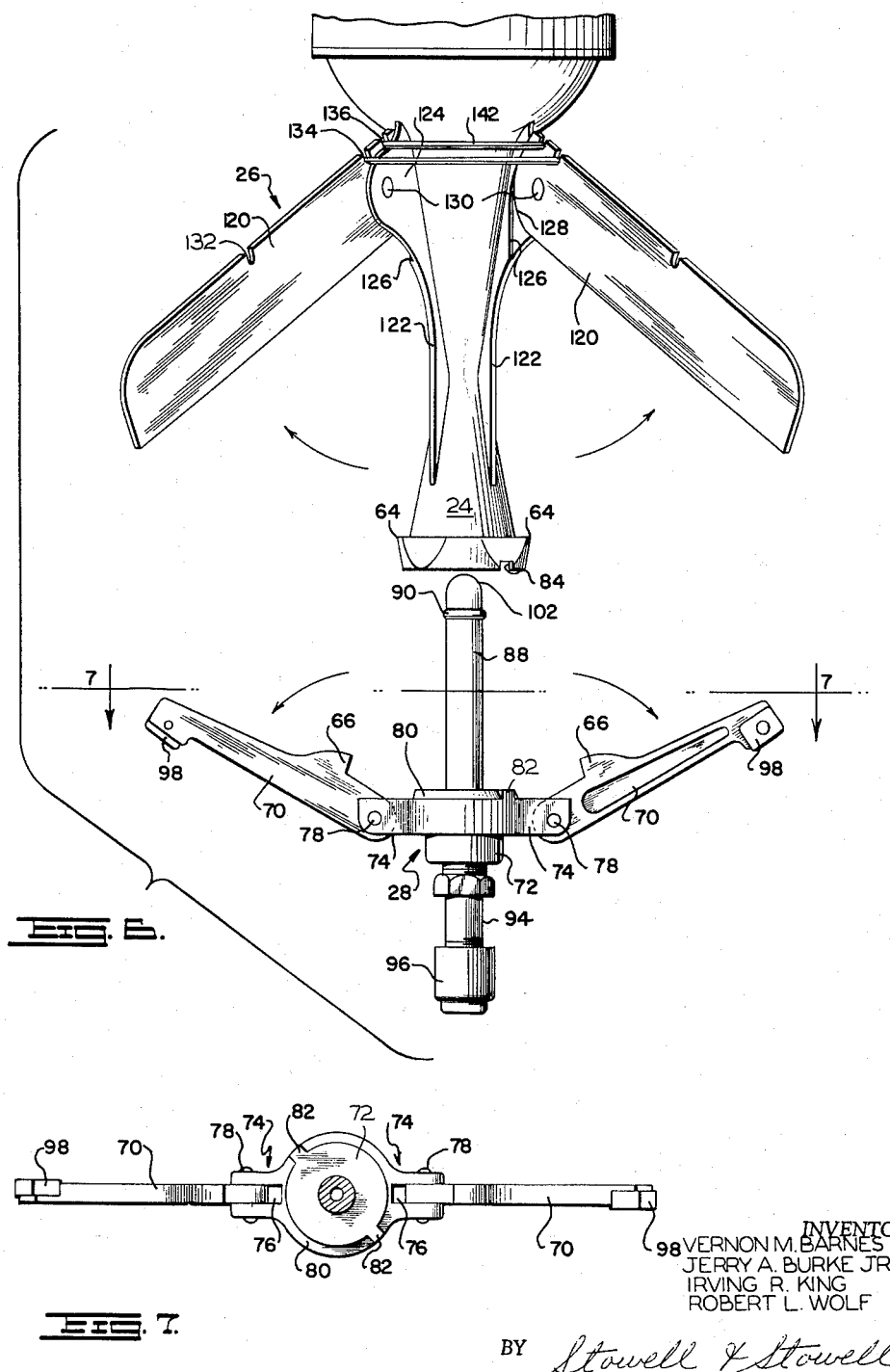

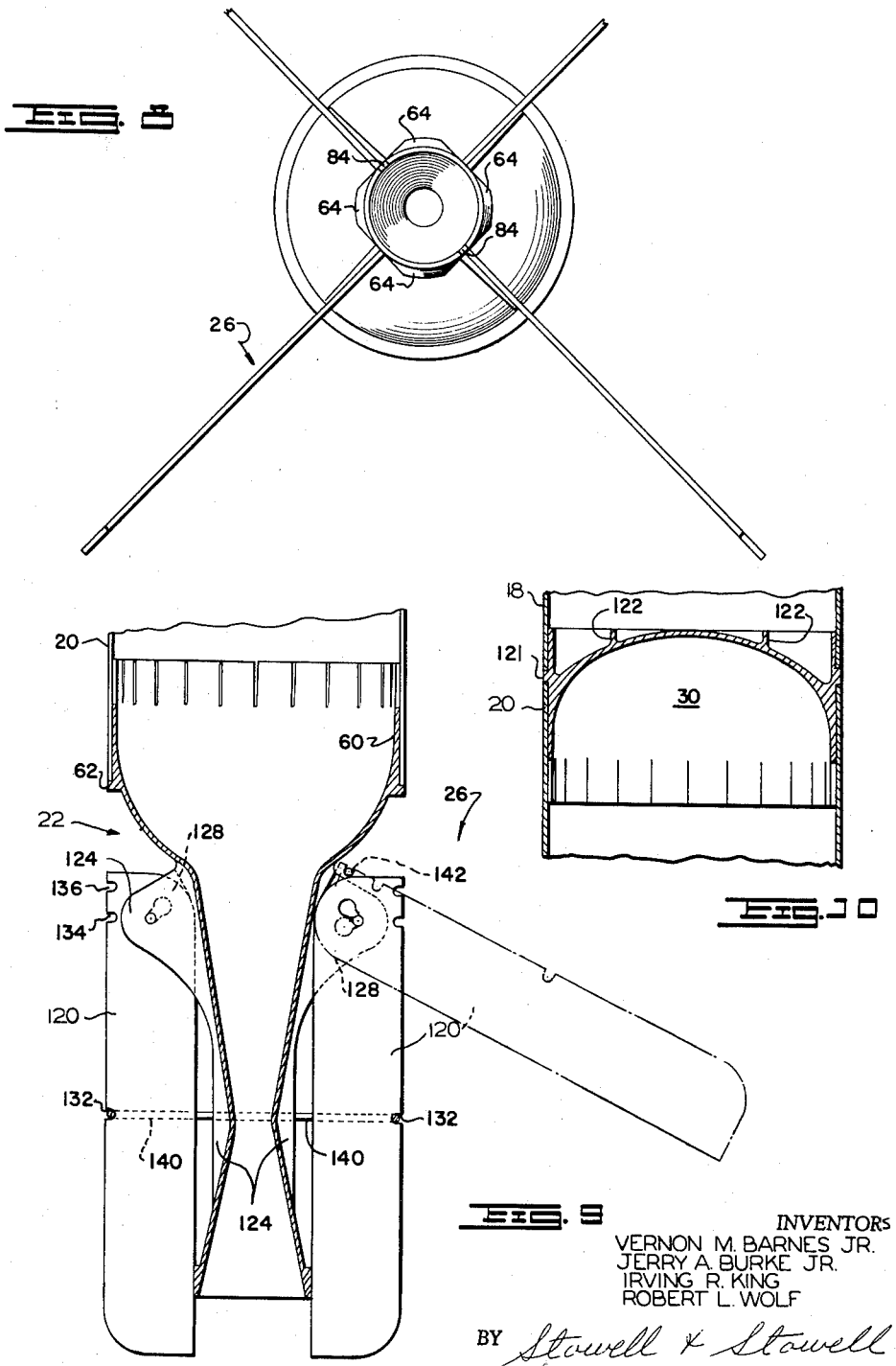

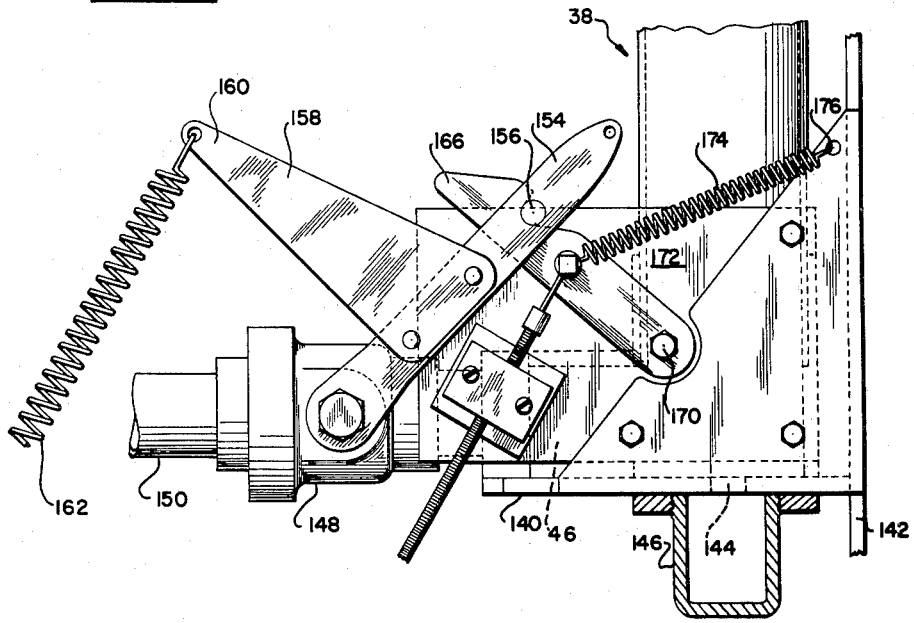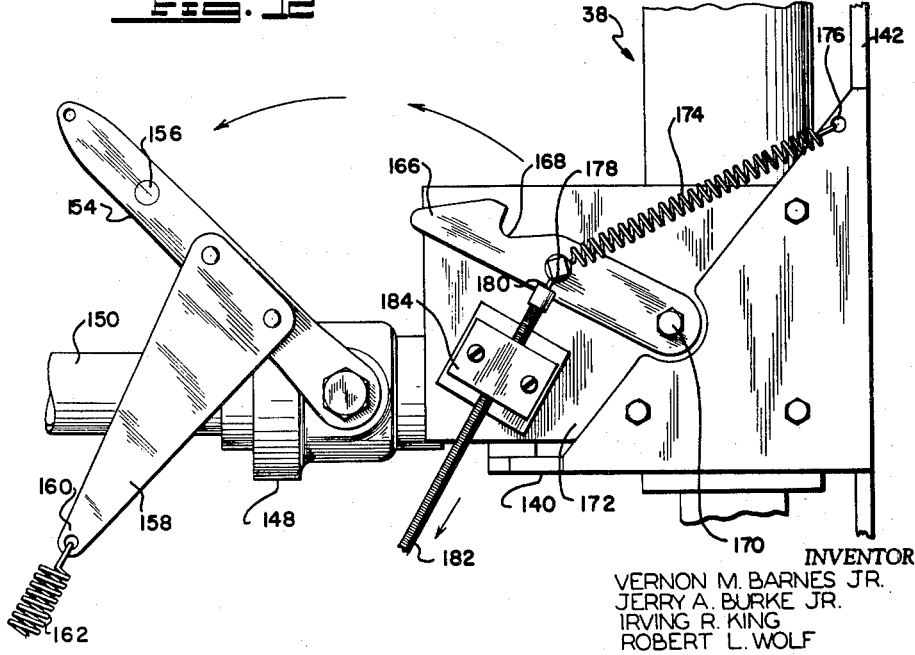

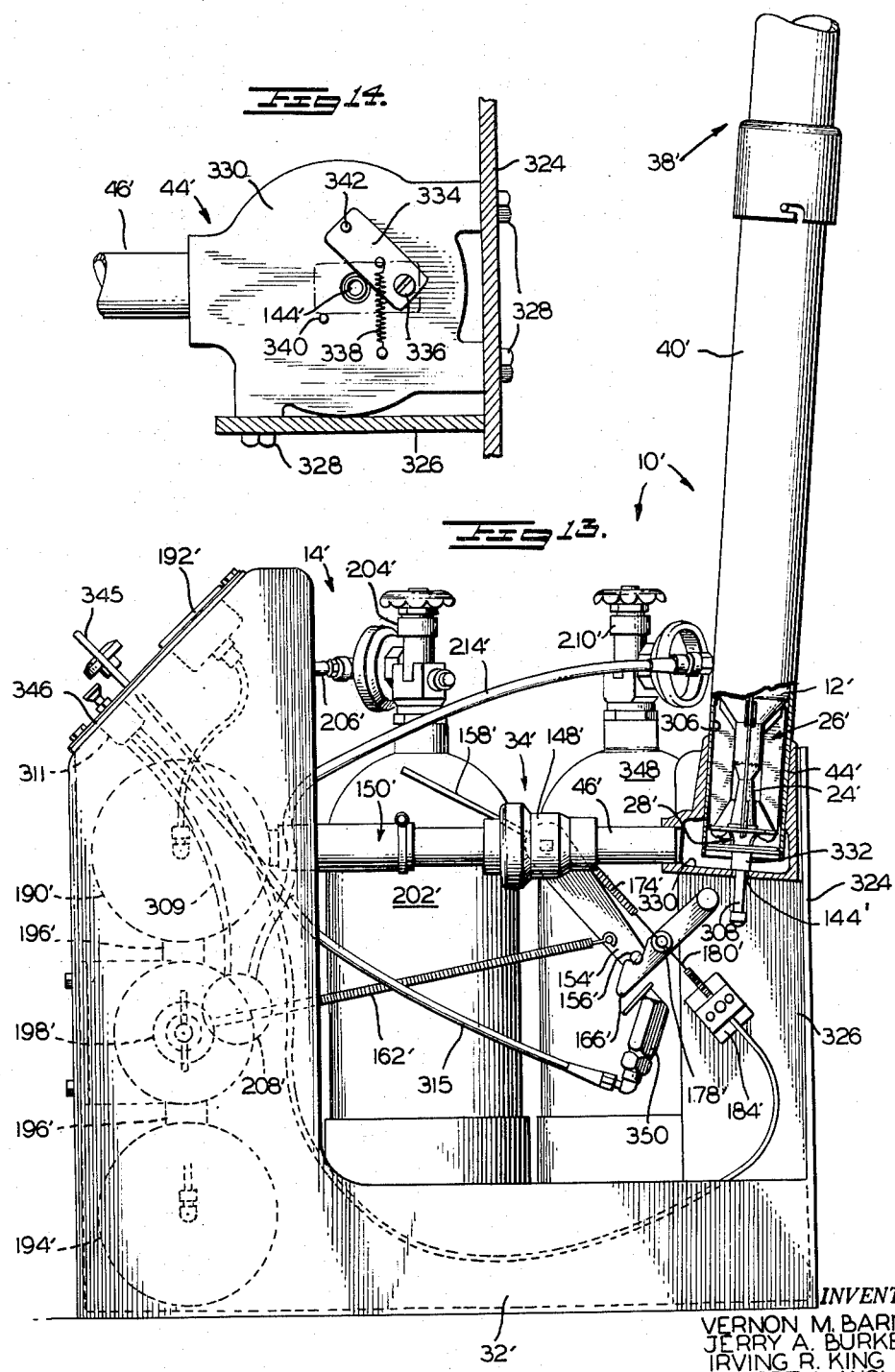

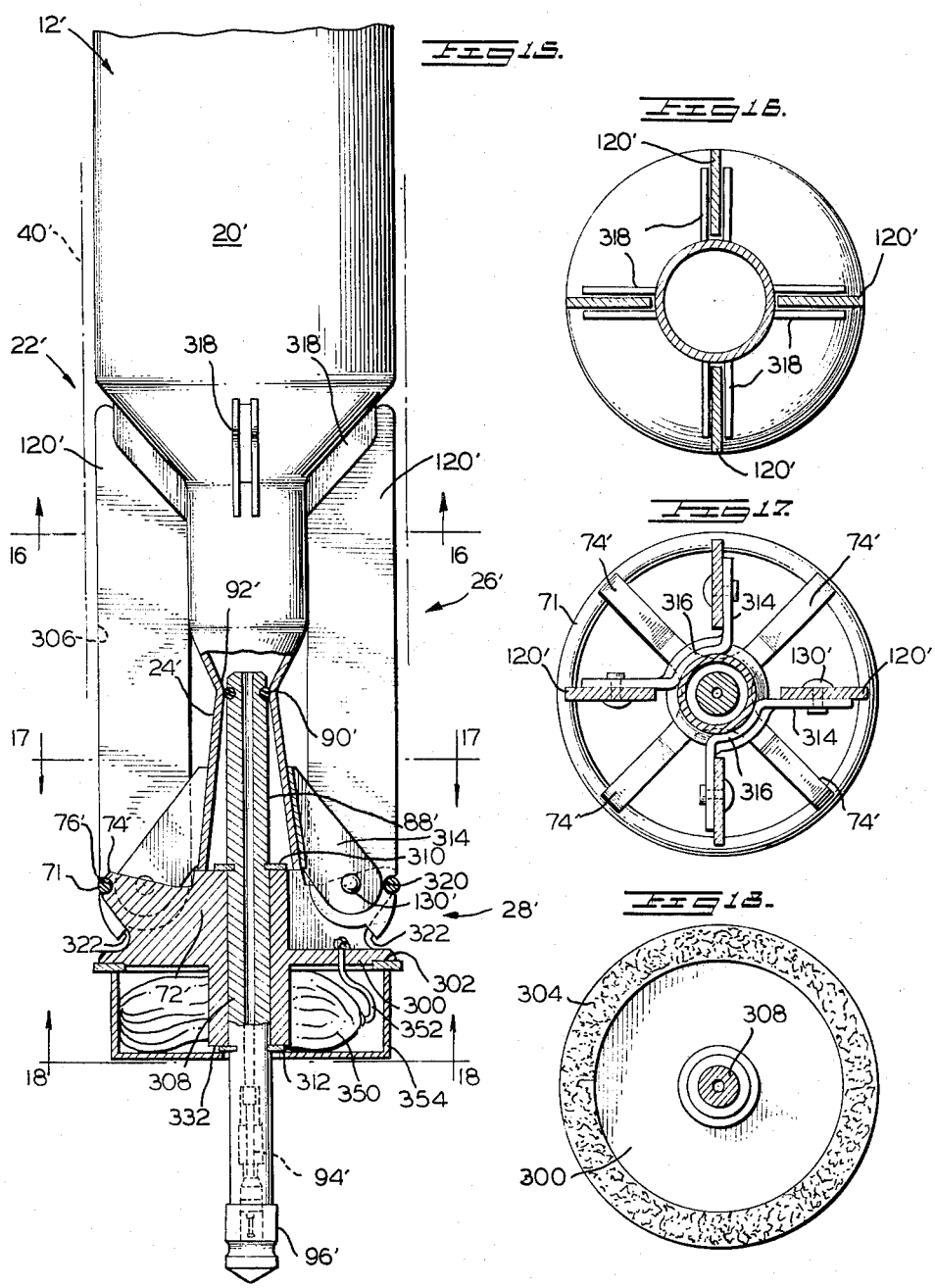

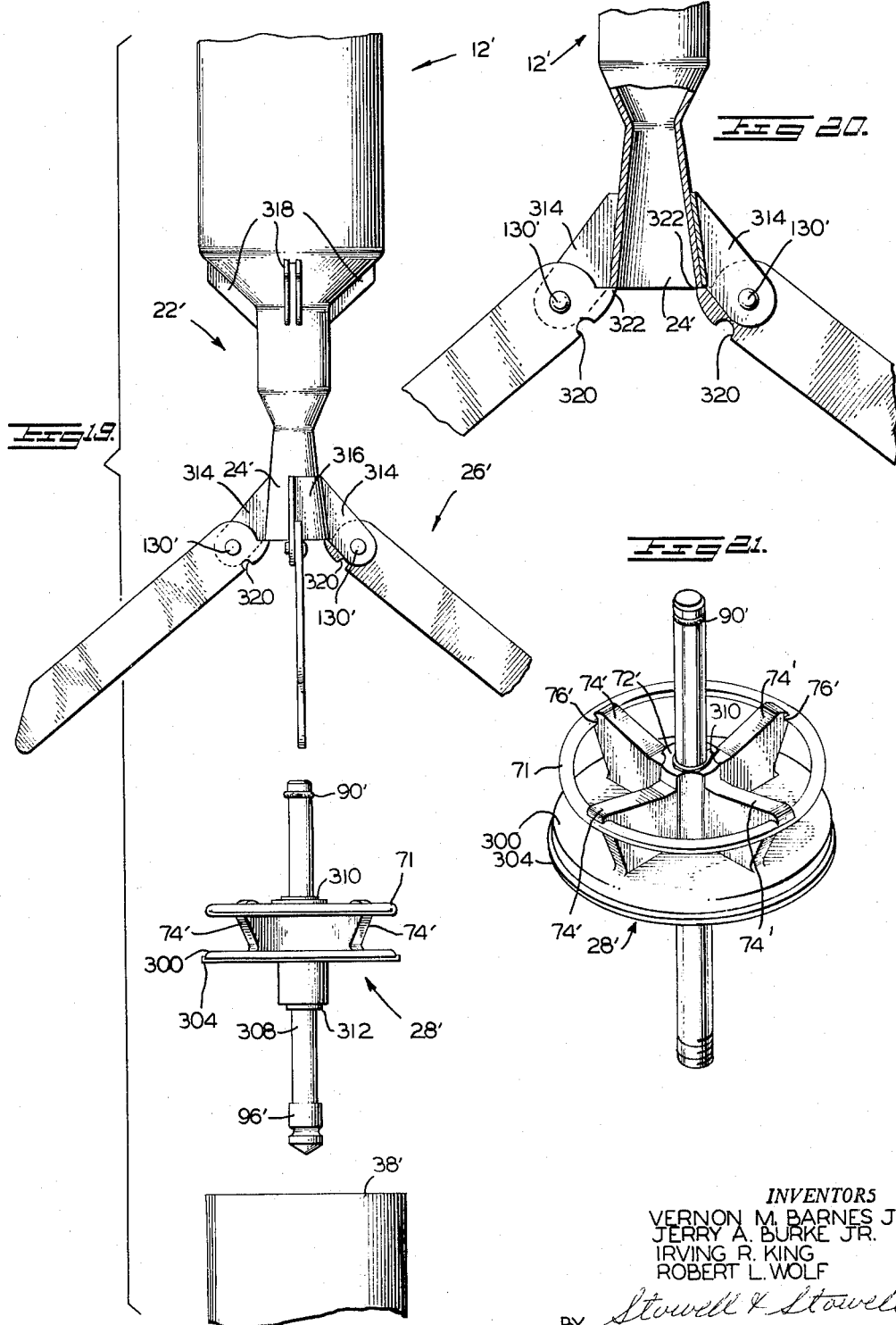

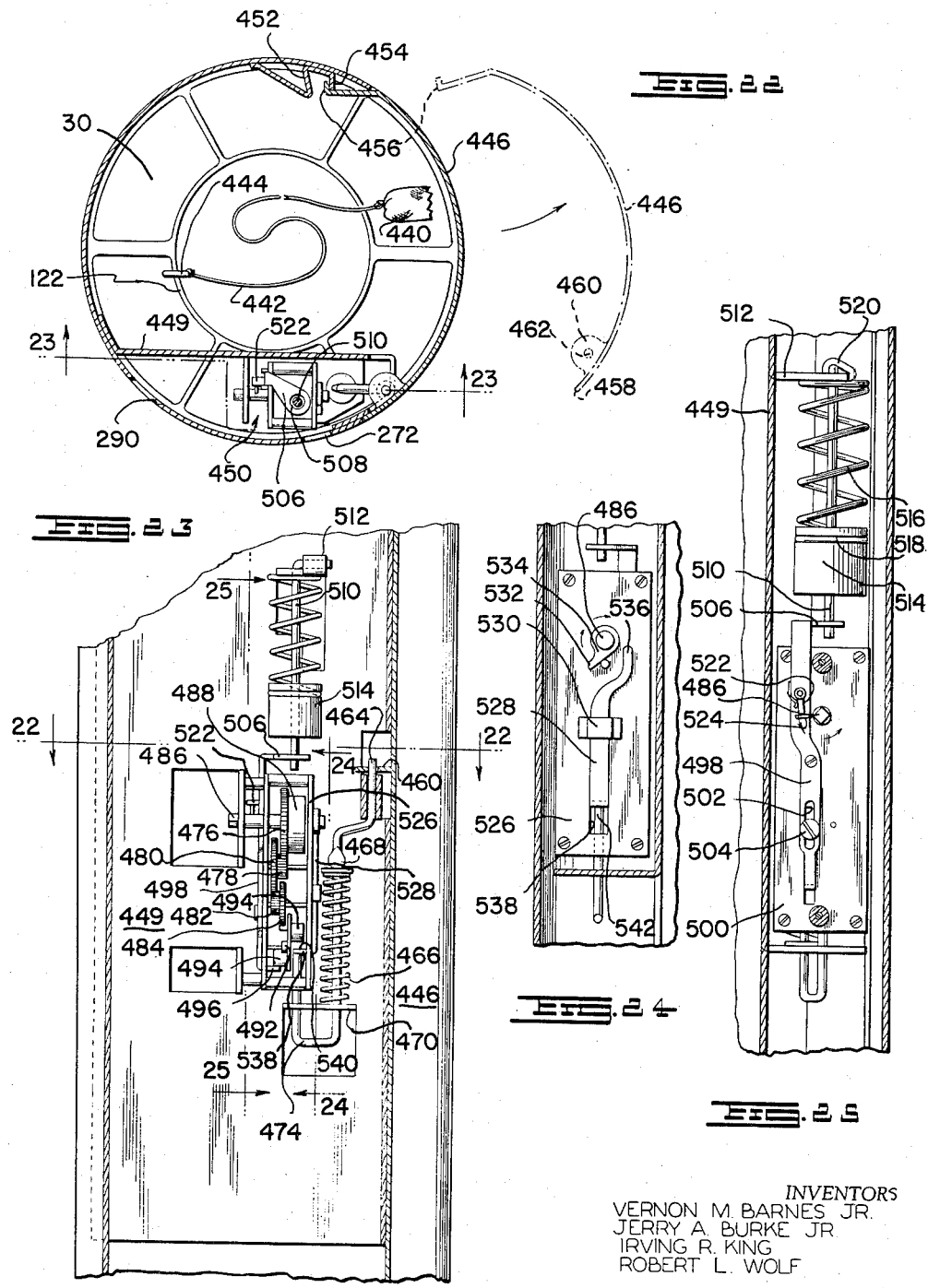

Filed Jan. 8, 1962  10 Sheets-Sheet 10

INVENTORS
VERNON M. BARNES JR.
JERRY A. BURKE JR.
IRVING R. KING
ROBERT L. WOLF

BY  *Stowell & Stowell*

ATTORNEYS

United States Patent Office 3,139,794
Patented July 7, 1964

3,139,794
LAUNCHER AND ROCKET
Vernon M. Barnes, Jr., and Jerry A. Burke, Jr., Chesterfield County, Irving R. King, Henrico County, and Robert L. Wolf, Chesterfield County, Va., assignors to Texaco Experiment Incorporated, Richmond, Va., a corporation of Virginia
Filed Jan. 8, 1962, Ser. No. 164,672
16 Claims. (Cl. 89—1.7)

This invention relates to a new and improved air traveling reaction propelled device and a launcher therefor and, more particularly, to a relatively small low-altitude rocket and launcher which are dependable in operation, relatively simple in construction and operation, and may be reused for plural flights merely by re-charging the reaction engine and launching mechanism.

The improved air traveling reaction propelled device has particular utility in low-altitude weather observation, weather prediction, cloud seeding, and air pollution studies and, depending on the mission for the rocket, the forward portion of the rocket body would carry instruments for sensing, transmitting and/or recording air temperature, barometric pressure, and humidity and means for obtaining air samples and/or means for discharging chaff, light reflecting metal particles, white or colored smoke, etc. to provide visual observation of wind direction and/or an approximation of wind speed.

It is an object of the invention to provide an air traveling reaction propelled device and launcher which may be safely used by amateur rocket groups and for training purposes for the armed services and the like.

Other objects and advantages are provided by an air traveling reaction propelled device and launcher therefor which, in general, comprises a rocket having a body portion adapted to receive a propellant composition, an outlet nozzle at one end of the body and communicating therewith, sealing means for the outlet nozzle, a launching tube adapted to slidably receive the rocket body adjacent the outlet nozzle, latch means cooperating with said launching tube and said outlet nozzle and maintaining the sealing means in sealed relation with the outlet nozzle, and means for propelling said rocket from the launching tube.

The novel features of the air traveling reaction propelled device and launcher will be more apparent to those skilled in the art from the following detailed description of the invention with reference to the accompanying drawings wherein:

FIG. 1 is a fragmentary elevational view of an embodiment of the air traveling reaction propelled device and the launcher means therefor;

FIG. 2 is a fragmentary vertical view in partial section of a portion of the launching structure with the rocket in launching position;

FIG. 3 is an enlarged elevational view of the rocket of the invention;

FIG. 4 is an enlarged fragmentary sectional view of the outlet nozzle end of the rocket particularly illustrating the stabilizing fins, the sealing means for the outlet nozzle and the latch means for maintaining the sealing means in sealing engagement with the nozzle prior to propelling the rocket from the launching structure;

FIG. 5 is a sectional view substantially on line 5—5 of the structure shown in FIG. 4;

FIG. 6 is an exploded view illustrating the release of the nozzle sealing means and the unfolding of the stabilizing fins of the rocket upon ejection of the rocket from the launching means;

FIG. 7 is a section substantially on line 7—7 of FIG. 6;

FIG. 8 is a plan view of the rocket looking forwardly toward the outlet nozzle and showing the stabilizing fins in the extended position;

FIG. 9 is an enlarged fragmentary sectional view of the nozzle portion of the rocket showing a pair of the stabilizing fins in the folded position and in phantom lines one of said stabilizing fins in the unfolded position;

FIG. 10 is an enlarged sectional view of the head portion of the propellant composition carrying portion of the rocket;

FIG. 11 is an enlarged fragmentary detailed view of the launching means for the air traveling reaction propelled device prior to initiation of the launching cycle;

FIG. 12 is a view of the structure shown in FIG. 11 following the initiation of the launching cycle;

FIG. 13 is a fragmentary elevational view, similar to FIG. 1, of a modified embodiment of the air traveling reaction propelled device and the launcher means therefor;

FIG. 14 is an enlarged fragmentary bottom plan view of the rocket tail section receiving housing modified to include sealing means therefor;

FIG. 15 is a fragmentary sectional view of the outlet nozzle end of the rocket particularly illustrating the stabilizing fins, the sealing means for the outlet nozzle and the latch means for maintaining the sealing means in sealing engagement with the nozzle prior to propelling the rocket from the launching structure of the form of the invention shown in FIG. 13;

FIG. 16 is a section substantially on line 16—16 of FIG. 15;

FIG. 17 is a section substantially on line 17—17 of FIG. 15;

FIG. 18 is a section substantially on line 18—18 of FIG. 15;

FIG. 19 is an exploded view illustrating the release of the nozzle sealing means and the unfolding of the stabilizing fins of the rocket shown in FIGS. 13-18 upon ejection of the rocket from the launching means;

FIG. 20 is an enlarged fragmentary partial sectional view of the rocket outlet nozzle and stabilizing fins;

FIG. 21 is a perspective view of the nozzle sealing means of the form of the invention shown in FIGS. 13 through 20;

FIGURE 22 is a section substantially on line 22—22 of FIG. 23 showing a portion of the automatic means for releasing the recovery parachute;

FIG. 23 is a fragmentary vertical section substantially on line 23—23 of FIG. 22;

FIG. 24 is a section substantially on line 24—24 of FIG. 23;

FIG. 25 is an enlarged vertical sectional view substantially on line 25—25 of FIG. 23;

Figure 26:
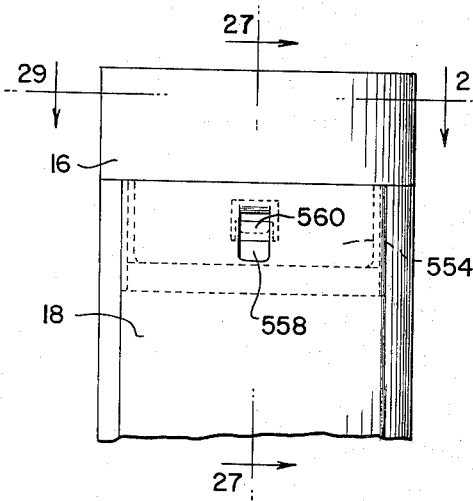
FIG. 26 is a fragmentary elevational view of a modified form of recovery section door release mechanism of the invention.

*General Description of Rocket and Launcher Therefor*

Referring to the drawings and, in particular, to FIGS. 1, 2 and 3, 10 generally designates an air traveling reaction propelled device and launcher therefor, including a rocket generally designated 12 and launching structure generally designated 14.

The rocket 12 generally comprises a nose section 16, an intermediate section 18, a propellant-storage section 20, and a tail section 22.

The tail section 22 generally includes an outlet nozzle 24, flight stabilizing means 26 and sealing means and rocket fueling mechanism 28.

The tail section 22 communicates with the propellant composition storage section 20 which section is sealed from the intermediate section 18 by a dome-shaped structural partition 30.

The intermediate section 18 and the nose section 16 are available to house the rocket instrumentation or the intermediate section 18 may receive rocket recovery mechanism which is automatically actuated at a predetermined time to release a parachute stored therein.

As hereinbefore set forth, the nose section 16 may contain various types of instruments depending upon the mission of the rocket; i.e., radio transmitting and/or recording apparatus associated with temperature, barometric pressure, and humidity sensing means and means for obtaining samples of the air and/or for releasing smoke or chaff, etc.

The rocket is preferably constructed of light material such as spun or cast aluminum, die-casting metal, or high impact strength plastic or combinations thereof. In a preferred form of the present invention, the tail section 22 and the dome 30 of the propulsion section are die-cast along with certain portions of the instrumentation and recovery sections while the remainder of the rocket body is spun of sheet aluminum and the sections are secured together by conventional fastening means and/or by cementing the sections together with, for example, an epoxy adhesive.

The launching structure 14 generally includes a platform 32 which supports the rocket release mechanism 34, the fueling and initial propelling means 36 and a generally vertically extending launching tube assembly 38. The launching tube is preferably made in several separable sections 40, 42 and 43, with the first or lowermost section 40 being supported by housing 44 adapted to receive the tail section of the rocket which, as to be more fully described hereinafter, has communication with the initial propelling means through a large conduit 46. With a rocket measuring approximately 30 inches, it has been found that a total length of launching tube assembly of about 11 feet has proved to be very satisfactory.

The length of the lowermost section 40 of the launching tube assembly 38 is preferably less than the overall length of the rocket whereby the rocket may be conveniently inserted into the first section and the folded fins and nozzle sealing and propellant filling structures 28 properly positioned within the housing 44. With the rocket positioned within the lowermost tubular section 40, one or more of the upper sections 42 and 43 may then be placed over the inserted rocket and secured to the next lower section by threaded coupling means generally designated 48 in FIGS. 1 and 2 of the drawings.

*Rocket Nozzle, Nozzle Seal and Filler Valve Structure*

The rocket nozzle and the propellant filling and nozzle sealing means will be particularly described with reference to FIGS. 2 and 4 through 9. The tail section 22 of the rocket is preferably of die-cast construction and, as more clearly shown in FIG. 9, includes an upper portion 60 adapted to be snugly received in the lower end of the propulsion composition storage section 20. The upper portion 60 of the tail section 22 is provided with a cylindrical boss 62 which makes edge contact with the lower end of the tubular portion of the rocket forming the propulsion composition storage section. Further, as hereinbefore set forth, the upper section 60 of the tail section may be secured to the lower portion of the propulsion section 20 by cementing the elements together with, for example, an epoxy adhesive.

The tail section is internally shaped to provide an outlet nozzle for the propelling composition and its lower end is provided with at least a pair of bosses 64 which project radially outward and, as to be more fully discussed, cooperate with lugs 66 carried by lever arms 70 of the latch means adapted to retain a combination propellant filling mechanism and nozzle sealing means 28 in propellant inserting and nozzle sealing relation to the outlet nozzle 24 of the rocket. Referring particularly to FIGS. 4, 6 and 7, the propellant filling and nozzle sealing means generally includes a plug member 72 having a pair of wing extensions 74 which are bifurcated as at 76 and receive their respective lever arms 70. The lever arms 70 are mounted on pivot pins 78 whereby the arms can pivot from a nozzle sealing position as illustrated in FIG. 4 to a nozzle release position as illustrated in FIGS. 6 and 7.

The plug 72 has a beveled edge portion 80 which edge is interrupted by a pair of bosses 82 adapted to be received in cooperating recesses 84 in the lower peripheral edge of the outlet nozzle 24. The recesses 84 are positioned relative to the bosses 64 such that with the bosses 82 in engagement with the recesses 84 lugs 66 on arms 70 will register with their cooperating bosses 64 adjacent the outlet end of the nozzle 24, as illustrated in FIGS. 4 and 5 of the drawings.

The plug member 72 has an upwardly extending nozzle insert 88 provided with a conventional O-ring sealing member 90 adjacent its upper end. The O-ring 90 is adapted to sealingly engage the inner wall of the outlet nozzle 24 adjacent the constriction 92 and thereby seal the propellant chamber and the upper section of the nozzle from the outlet end thereof. Where the sealing mechanism for the outlet nozzle also functions as the means for directing all or a portion of the propellant composition into the propellant storage section, the plug 72 and the vertically extending portion 88 are of hollow construction and the lower end of the plug 72 is adapted to threadedly receive a valve member 94.

The valve member 94 may conviently comprise a conventional high pressure tire valve core, and, as illustrated in the drawings, the lower end of the valve may be provided with a conventional valve cap 96 to protect the valve mechanism from dirt and prevent damage thereto when the propellant filling and nozzle sealing means drops back to earth following the discharge of the rocket from the launching device as to be more fully described hereinafter.

Each of the lever arms 70 is provided with a bearing pad such as the illustrated Teflon inserts 98 adjacent the ends of the arms remote from their pivotal connections to the plug member 72. The Teflon bearing inserts 98 are adapted to engage the inner surface 100 of the launching tube assembly 38 when the rocket is in launching position within the launching tube sections and the lugs 66 are in engagement with their respective bosses 64 at the outlet end of the nozzle 24. The launching relationship between the propellant filling and nozzle sealing means and the launching tube assembly 38 are more clearly illustrated in FIGS. 4 and 5 of the drawings. It will be particularly noted that the lugs 66 are provided with sloping faces whereby the pressure acting on the upper end 102 of the extension 88 readily brings about disengagement of the propellant fueling and nozzle sealing means as soon as the rocket is propelled from the launching tube 38.

*Stablizing Fin Assembly*

Referring particularly to FIGS. 2 and 4 through 9, the discharge end 22 of the rocket also supports a plurality of radially spaced stabilizing fins 120. In the illustrated form of the invention four equally radially spaced fins 120 are employed, and each fin 120 is pivotally mounted by a pin 130 to the outlet nozzle 24. The outlet nozzle 24 is also provided with four radially spaced flanges 122, the lower portions of which act as reinforcing means for the outlet nozzle 24 while the upper ends 124 are adapted to pivotally mount the plural stabilizing fins 120. It will be particularly noted that the upper ends 124 of each of the flanges 122 is milled as at 126 to provide guideways for the fins and that the curved inner ends of the milled surfaces 126 cooperate with the curved upper ends 128 of the fins and limit the outward and upward movement thereof following the propulsion of the rocket from the launching means. It will also be particularly noted that the width of each of the fins 120 is so selected that when the fins are in their downwardly folded position such as illustrated in FIG. 9 that the fins do not project radially outwardly a distance greater than the maximum diameter of the rocket 12 whereby the rocket carrying the fins may be projected from the launching tube 38 without interference from the fins.

Each of the fins is provided with a plurality of recesses 132, 134 and 136. Recesses 132 are positioned in the fins below the pivotal axis of the fins to the flanges 124; recesses 134 are positioned substantially on the pivotal axis when the fins are in the folded position and above the pivotal axis when the fins are extended; and recesses 136 are positioned above the pivotal axis of the fins at all times. Prior to placing the rocket in its launching tube a resilient band designated 140 is received in the lowermost grooves 132 and holds the fins in the folded position as illustrated in FIG. 9. Upon inserting the rocket into the launching tube, the resilient band 140 is moved to the grooves 134 while a further resilient band 142 is maintained in the uppermost set of grooves 136. The band 140 positioned in grooves 134 cooperating with the resilient effect of band 142 positioned in the uppermost grooves 136 urge the fins 120 to the radially extended flight stabilizing position illustrated in FIGS. 3, 6 and 8 as soon as the rocket is propelled from the launching tube. It will be noted that with the fins 120 folded and resilient band 140 in groove 134, said band provides little tendency to urge the fins to the extended position as groove 134 is substantially on the pivotal axes of the fins. This reduces the drag of the edges of the fins on the inside wall of the launcher tube sections. When the rocket leaves the launcher tube sections and the fins are extended, groove 134 is above the pivotal axes of the fins and band 140 received therein cooperates with band 142 to urge and hold the fins in the extended position.

While specific forms of nozzle, nozzle seal, and stabilizing fins have been shown and described, it will be apparent that various modifications and changes may be made therein by those skilled in the art without departing from the scope of the invention. For example, the lower ends of at least a pair of the fins 120 may be provided with means cooperating with suitable lugs on the nozzle plug 72 to retain the seal in propellant filling and nozzle sealing position when the fins are in the downwardly folded position. This form of construction eliminates the need for the lever arms 70 which are pivotally mounted to the nozzle plug 72.

Further, it will be appreciated that the fins 120 may be pivotally mounted adjacent the lower end of the nozzle and fold upwardly and means may be associated with the upwardly folding fins to retain the nozzle plug 72 in the propellant filling and nozzle sealing position.

A form of the invention wherein the fins are pivotally mounted adjacent the lower end of the nozzle, fold upwardly and are provided with means cooperating with the nozzle plug to retain the nozzle plug in the propellant filling and nozzle sealing position as illustrated in FIGS. 13 through 21. In FIGS. 13 through 21, structures corresponding to those illustrated and described with reference to FIGS. 1 through 12 are provided with primed reference characters.

Referring to FIGS. 13 through 21, 10′ generally designates a modified form of the air traveling reaction propelled device and launcher therefor, including the rocket generally designated 12′ and launcher structure generally designated 14′. The rocket 12′, like the rocket 12, generally includes a nose section, an intermediate section, a propellant storage section and a tail section 22′. The nose section, the intermediate section and the propellant storage section of the rocket 12′ may be identical to the structures illustrated in FIGS. 1 through 12, and further illustration thereof is deemed to be unnecessary.

The tail section 22′ of the rocket generally includes an outlet nozzle 24′, flight stabilizing means 26′ and propellant filling and nozzle sealing means 28′.

The launching structure 14′ generally includes a launching platform structure 32′ which supports the rocket release mechanism 34′, the fueling and initial propelling means for the rocket and a generally vertically extending launching tube assembly 38′. The launching tube assembly is preferably made in several separable sections with the lowermost tube section 40′ being supported within a housing 44′ adapted to receive the tail section of the rocket which, as to be more fully described hereinafter, has communication with the initial propelling means through a large conduit 46′.

The modified form of the rocket nozzle and the propellant filling and nozzle sealing means will be more particularly described with reference to FIGS. 13, 15, 19 and 21. The tail section 22′ of the rocket is snugly received in the lower end of the propulsion composition storage section 20′ as described with reference to the form of the invention shown in FIGS. 1 through 12.

The propellant filling and nozzle sealing means 28′ generally includes a plug member 72′ provided with a plurality of arm members 74′ which are grooved as at 76′ to receive a ring member 71. The ring member 71 cooperates with means carried by the rocket stabilizing fins to maintain the propellant filling and nozzle sealing means in operative engagement within the lower end of the outlet nozzle as to be more fully described hereinafter.

A disc 300 is formed integrally with the lower surfaces of the arms 74′, which disc is provided with a recess 302 adapted to receive a resilient sealing ring 304. The ring 304 may consist of a woven or non-woven felt-like material which sealingly engages the inner wall 306 of the launching tube assembly 38′ within the housing 44′ as shown in FIG. 13. Thus, the diameter of the disc portion 300 is slightly less than the inner diameter of the launching tube assembly 38′ so that only the outer peripheral surface of the sealing ring 304 engages the inner side walls of the launching tube sections during the passage of the rocket from the launching tube assembly 38′.

The plug member 72′, including the integral arms 74′ and disc portion 300 are retained on the stem 308 by means of upper and lower snap rings 310 and 312, respectively.

The stem 308 has an upwardly extending nozzle insert portion 88′ provided with a conventional O-ring sealing member 90′ adjacent the upper end of the insert 88′. The O-ring 90′ is adapted to sealingly engage the inner wall of the outlet nozzle 24′ adjacent the constriction 92′ and thereby seal the propellant chamber and the upper section of the nozzle from the outlet end thereof. Where the sealing mechanism from the outlet nozzle also functions as the means for directing all or a portion or the propellant composition into the propellant storage chamber 20′ of the rocket, the stem 308, including the vertically extending portion 88′ is of hollow construction and the lower end of the stem 308 is adapted to threadedly receive a valve member 94′.

The valve member 94′ may conveniently comprise a conventional high-pressure tire valve core and, as illustrated in the drawings, the lower end of the stem 308 may be provided with a valve stem cap 96′ to protect the valve mechanism from dirt and prevent damage thereto when the propellant filling and nozzle sealing means drops back to earth following the discharge of the rocket from the launching tube assembly.

Where desired, a small parachute 350 may be employed to break the fall of the nozzle plug. In FIG. 15 the parachute 350 is illustrated with its lanyard 352 fastened to disc 300. The parachute and lanyard are housed during launching in a light weight cap member 354 loosely slidable mounted on the lower stem portion of the nozzle plug.

Modified Stabilizing Fin Assembly

In the modified form of the invention, four equally radially spaced fins 120' are employed to stabilize the rocket flight and each of the fins 120' is pivotally mounted by a pin 130' to a wing portion 314 of a pair of brackets 316 positioned adjacent the outlet end of the outlet nozzle structure 24'.

The upper end of the outlet nozzle 24' is also provided with four equally radially spaced brackets 318 with the opening in each of the brackets 318 being longitudinally aligned with its corresponding wing portion 314 of brackets 316 which pivotally mount the fins 120' to the rocket, whereby when the fins 120' are in their upwardly folded position as more clearly illustrated in FIGS. 15 and 16, the upper ends of the fins are received in the brackets 318. Each of the fins 120' is provided with a groove 320 which groove is substantially laterally aligned with the axis of the pivot pins 130' when the fins 120' are upwardly folded as illustrated in FIG. 15. The grooves 320 in the fins 120' engage the ring 71 of the nozzle plug and maintain the nozzle plug in sealing engagement within the outlet nozzle 24' when the fins are in the upwardly folded position. After launching of the rocket from the launching tube assembly 38', pressure within the propellant storage chamber 20' of the rocket acting on the nozzle plug extension urges the plug outwardly and the cooperation between the ring 71 and the grooves 320 on each of the fins causes the fins to fold downwardly about the axis of each of the pins 130' to release the nozzle plug and to position the fins in their flight stabilizing position as illustrated in FIGS. 19 and 20.

Each of the fins 120' is also provided with a boss 322. The bosses 322 engage the outlet end of the outlet nozzle 24' when the fins are in the extended active position as illustrated in FIGS. 19 and 20. Thus, the bosses 322 cooperate with the outlet end of the outlet nozzle to determine the active flight stabilizing position of the fins relative to the rocket.

It is also pointed out that the width of the fins 120' is such that when the fins are in the folded position as shown in FIGS. 15 and 16 the extended edge of each of the fins and the outside edge of the ring 71 of the nozzle plug, do not project laterally a distance greater than the diameter of the rocket body whereby the rocket body with the fins in the folded position may be readily received within the rocket launching tube assembly 38'.

Propellant Chamber and Propellant Composition

Referring particularly to FIGS. 3, 9 and 10, the propellant composition-receiving portion of both forms of the rocket is provided with a head 30 which head, like the tail section of the rocket, is preferably die-cast and provided with an annular flange 121 so that when the head portion 30 is joined to the shell of the recovery section 18 and the shell of the propellant-charged storage section 20, a relatively smooth outer surface is provided for the rocket. The head 30 may be mounted to the shell of the propellant composition storage compartment and to the recovery section 18 in any suitable manner and in the illustrated form of the invention an epoxy adhesive is employed as the mounting means. It will be particularly noted from FIG. 10 of the drawings that the die-cast head is provided with a plurality of ribs 122 which provide the necessary strength for the head without materially increasing the weight of the rocket.

The rockets of the invention are designed for use with non-burning propellants and preferably propellant compositions consisting of low temperature boiling, liquefiable normally gaseous materials; gases dissolved in a liquid or mixtures of liquids, or such gases dissolved in a solution of a solid or solids in a liquid or liquids and maintainable under pressure within the propellant composition storage compartments 20 of the rockets. Suitable propellant compositions for the rocket are, for example: ammonia, Freon, sulphur dioxide, methyl chloride, propane, butane; solutions of gases in liquids, such as, carbon dioxide in water, dimethyl ether in water, difluoroethane in alcohol, and the like.

While the above listed propellants and others may be satisfactorily employed in the rocket of the invention, the preferred propellant composition consists of carbon dioxide and acetone. The acetone-carbon dioxide propellant combination has been found to be particularly advantageous as carbon dioxide and acetone are relatively inexpensive, readily available, relatively non-toxic, non-corrosive and the pressure in a cylinder of liquid carbon dioxide is adequate for charging the rocket. Carbon dioxide is very soluble in acetone, and about equal parts by weight of acetone and carbon dioxide under a pressure of about 500 p.s.i. at about room temperature has been found to provide very satisfactory results.

The volume increase of the acetone upon solution of the carbon dioxide is susbtantial. For example, starting with 500 cc. of acetone, the volume of the acetone-carbon dioxide system would be about 532 cc. at 132 pounds pressure; about 553 cc. at 170 pounds pressure; about 642 cc. at 300 pounds pressure; about 765 cc. at 400 pounds pressure; and about 968 cc. at 500 pounds pressure. The propellant composition consisting of acetone and carbon dioxide is very efficient and a rocket having a diameter of about 2.5 inches and a length of about 30 inches from the nose to the lower end of the nozzle when charged with one pound of acetone and one pound of carbon dioxide and carrying a one-half pound payload for a total weight of 4 pounds will propel the rocket to an altitude of about 3000 feet at a maximum speed of about 540 feet per second from an initial speed of about 100 feet per second at the time the rocket leaves the launching tube. The maximum speed will be attained at the end of a thrust period of about 1.2 seconds permitting the rocket to coast to about 3000 feet in about 12 seconds.

It will be apparent where higher pressures are used, greater thrust is obtainable and under higher pressure conditions, the acetone will dissolve a greater amount of carbon dioxide.

Launching Structure and Method

Referring particularly to FIGS. 1, 2, 11 and 12, the housing 44 of the launching tube assembly 38 is secured to a plate member 140 which plate is in turn secured to generally vertically extending plate members 142 and 143 whereby the lower end of the launching tube assembly 38 is positioned above the launching platform 32. The plate member 140 is provided with an opening 144 adapted to receive the extended end of the filler valve structure 94 and a suitable removable protective cover 146 may be provided to make the lower end of the launching assembly gas tight.

As hereinbefore set forth, the housing 44 of the launching tube assembly 38 is connected to a large conduit 46 which is connected to a quick-opening valve 148 which, in turn, is connected to a source of pressurized gas by a conduit 150. The quick-acting valve 148 directs pressure fluid from the source of pressure fluid to the housing 44 and expansion of the gases propels the rocket 12 from the tube sections.

The quick-acting valve 148 is provided with a valve-actuating lever 154. The lever 154 is provided with a pin 156 which projects at right angles therefrom and the lever 154 also has secured thereto a lever arm 158. The extended end 160 of the lever arm 158 receives one end of a resilient biasing means illustrated as helical spring 162. The other end of the helical spring 162 is secured as at 164 to one end of the launching platform 32 and normally biases the valve actuating arm 154 in the open position as illustrated in FIG. 12 of the drawings. The valve is maintained in the closed position by a latch arm 166 provided with a pin-engaging recess 168. The latch arm 166 is pivoted as at 170 to the supporting frame 172 of the launching platform structure. The latch arm 166 is normally biased upwardly by resilient means shown as helical spring 174 having one end secured to the launching structure at 176 while the other end of the helical spring engages coupling 178 carried by the arm 166. The coupling 178 also receives one end of a flexible draft means or firing cable 180. The protective sheath 182 for the firing cable is secured by bracket means 184 to the side wall 172 of the launching platform structure. The other end, not shown, of the firing cable 180 is positioned at a point remote from the launching device 14.

The cooperation between the spring-urged latch arm 166, the valve arm 154 and its pin member 156 and the resilient means normally urging the valve to the open position are illustrated in the ready position in FIG. 11 wherein the pin 156 is engaged by the latch detent 168 of the latch arm 166 thereby holding the valve 148 in the closed position.

Referring particularly to FIG. 1 of the drawings, conduit 150 connected to the quick-release valve 148 connects the valve to a low-pressure reservoir generally designated 190. The low-pressure reservoir is conveniently provided with a conventional pressure gauge 192. The low-pressure reservoir 190 is connected to an intermediate pressure reservoir 194 by a conduit 196 through a conventional pressure-reducing valve 198. The intermediate pressure reservoir 194 is also conveniently provided with a conventional pressure gauge 200. The intermediate pressure reservoir 194 is connected to a source of gas or liquid under high pressure such as liquid carbon dioxide storage cylinder 202 via a manually actuated valve 204, conduit 206 and conventional pressure regulating valve 208.

A further manually actuated valve 210 leads from the output union 212 which valve controls the flow of carbon dioxide in the flexible rocket charging line 214. The extended end of the flexible rocket charging line 214 is provided with a threaded coupling adapted to be screwed to the threaded end of the valve stem 94 carried by the plug member 72 releasably engaging the extended end of the rocket nozzle 24.

*Operation of Rocket Shown in FIGS. 1–12*

With the nozzle plug 72 removed from the rocket 12 and the rocket held in the inverted position an acetone charge of about 1 pound is poured into the propulsion section 20 through the opening in the outlet nozzle 24. The nozzle plug is then inserted and the arm members are urged together so that the lugs 66 engage their respective bosses 64; the plural stabilizing fins 120 are held in the downwardly folded position with the resilient band means in fin grooves or notches 134 and 136. The rocket is then placed in the lowermost launching tube section 40 so that the valve stem 94 and cap 96 project through the opening 144 in the plate 140. As a safety measure, the upper sections 42 and 43 of the launching tube are then attached to the lowermost section 40 prior to pressurizing the propellant section 20.

The valve cap 96 and the cap seal 146 are removed and the threaded coupling end of the flexible conduit 214 is screwed to the threaded end of the valve stem 94.

The pressure regulators 208 connected to the liquid carbon dioxide container 202 is set for approximately 500 pounds per square inch and the valve 210 is manually opened. The carbon dioxide storage cylinder 202 has an internal line extending to the bottom of the cylinder so that when the valve 210 is opened, liquid carbon dioxide is forced through the pressure regulator valve 208 and the rocket charging valve 210, flexible conduit 214, and into the propulsion section of the rocket. The rocket is pressurized to about 500 pounds per square inch whereby approximately one pound of liquid carbon dioxide is mixed with one pound of acetone initially placed in the propulsion section 20 of the rocket. Since the carbon dioxide is charged principally as a cold liquid, it overcomes the heat evolved during solvation of the carbon dioxide in the acetone. Partial expansion of the carbon dioxide through the regulator 208 and the valve 210 cools the liquid sufficiently to bring about the substantial balance with the heat evolved.

When the propulsion section 20 is charged to a pressure of about 500 pounds per square inch, the valve 210 is closed and the pressure is bled from the flexible filling line 214 via bleed valve 215, the cap 96 is replaced on valve stem 94 and the sealing cap 146 is replaced rendering the launching tube assembly 38 substantially gas-tight at the lower end.

The quick-release valve 148 is then closed and the valve actuating arm 154 is latched in the valve closed position by the latch arm 166 as illustrated in FIG. 11 of the drawings. The intermediate pressure reservoir 194 is then pressurized by opening the valve 204 and charging the container with carbon dioxide from the carbon dioxide storage container 202. While intermediate pressure reservoir 194 is being filled, the low pressure reservoir 190 is also being filled to approximately 20 pounds per square inch via pressure reducing valve 198 and conduit 196. With the low and intermediate storage vessels 190 and 194, respectively, pressurized to 20 pounds and 200 pounds per square inch, valve 204 is closed and the valve connected to the high pressure liquid carbon dioxide storage container 202 is closed. The rocket is then ready for launching.

Launching of the rocket is accomplished by pulling on the extended end of the firing cable 180 to overcome the tension of spring 174 whereby latch arm 166 is urged downwardly releasing pin 156 from the latch arm detent. With the pin 156 released, spring 162 urges the valve actuating handle 154 to the valve open position. Opening of the valve 148 admits carbon dioxide under 20 pounds per square inch pressure from the low and intermediate pressure reservoirs into the lower end of the launching tube via conduit 46. The sudden release of the carbon dioxide into the launching tube accelerates the rocket 12 to about 100 feet per second when the rocket is about 30 inches tall and about 2½ inches in diameter and weighs about 4 pounds in about .2 second. As the rocket leaves the launching tube, the nozzle plug 72 is unlatched from the lower end of the outlet nozzle 24 and the pressure of the propelling charge forces the sealing plug 88 from the nozzle and the carbon dioxide-acetone propellant charge takes over and accelerates the rocket to about 540 feet per second with the propellant charge of about 1 pound of acetone and 1 pound of carbon dioxide providing thrust for about 1 to 1.2 seconds. The rocket then coasts to about 3,000 feet in about 12 seconds.

Referring particularly to FIGS. 13 and 14 of the modified form of the rocket, the housing 44′ which supports the launching tube assembly 38′ is secured by bolts 328 to a back plate member 324 and to a generally vertically extending plate member 326 of the launching platform structure 32′. The bottom 330 of the housing 44′ is provided with an opening 144′ adapted to receive the lower portion of the stem 308 of the propellant filling and nozzle sealing means 28′. It will be particularly noted from FIG. 13 that the size of the opening 144′ is large enough to receive the stem 308 while the lower end 332 of the nozzle plug 72' and disc 300 covers the opening 144' when the rocket is within the launching tube assembly in the "at rest" position, and the opening 144' is not uncovered until launching of the rocket begins. It has been found that loss of pressure fluid from the opening 144' during launching of the rocket does not materially affect the launch at normal launching pressures; however, where desired, a small spring operated gate 334 may be pivoted on a pivot pin 336 to the undersurface 330 of the housing 44' as illustrated in FIG. 14. The gate 334 is biased in a direction to swing the gate over the opening 144' by spring 338 as soon as the stem 308 of the nozzle sealing means is withdrawn from the opening during launching of the rocket. A pin 340 may also project from the undersurface of the housing 44' to restrict the amount of pivotal movement of the gate 334. Also the gate 334 may be provided with a boss 342 so that the gate may be conveniently swung to the open position when inserting a rocket within the launching tube assembly.

As hereinbefore set forth, the housing 44' of the launching tube assembly 38' is connected to a large conduit 46' which, in turn, is connected to a quick opening valve 148'. The conduit 46' is also connected to a source of pressurized gas by a conduit 150'. The quick acting valve 148' and the conduits 46' and 150' direct pressure fluid from the source of pressure fluid to the lower end of the launching tube housing 44' and expansion of the gases in this space propels the rocket from the launching tube assembly.

The quick acting valve 148' is provided with a valve actuating lever 154'. The lever 154' has secured thereto a pin 156' which projects at right angles therefrom and the lever 154' also has secured thereto a cocking lever 158'. The extended end of the lever 154' is fastened to one end of a resilient biasing spring 162'. The other end of the spring 162' is secured to the launching platform structure 32' and normally biases the valve actuating lever 154' to the open position. The valve is maintained in the closed position by a latch arm 166' provided with a pin-engaging recess. The latch arm 166' is pivoted to the frame member 326 of the launching platform structure and the arm is normally biased upwardly by the helical spring 174'.

A coupling 178' receives one end of a flexible draft means or firing cable 180', the protective sheath of which is secured by bracket means 184' to the wall member 326. The other end of the firing cable 180' is secured to a handle 345 which is positioned on the sloping face 346 of the launching platform structure 32'.

Conduit 150', connected to the quick release valve 148', connects the valve to a low pressure reservoir generally designated 190'. The low pressure reservoir is conveniently provided with a conventional pressure gauge 192'. The low pressure reservoir 190' is connected to an intermediate pressure reservoir 194' by a conduit 196' through a conventional pressure reducing valve 198'. The intermediate pressure reservoir 194' is connected to a source of gas or liquid under high pressure, such as liquid carbon dioxide storage cylinder 202' via a manually actuated valve 204' and conduit 206'.

A further manually actuated valve 210' on high pressure stoorage cylinder 348 controls the flow of carbon dioxide to the flexible rocket charging line 214' which is connected to pressure regulator 208'. A line 309 connects the outlet side of regulator 208' to a needle valve 311 on the front panel of the launching platform structure 32'. The outlet side of the needle valve is connected to flexible charging line 315, the extended end of which is provided with a quick connect coupling 350 adapted to receive the stem 308 of the propellant filling and nozzle sealing means 28'.

With the nozzle plug 72' removed from the rocket 12' and the rocket held in the inverted position an acetone charge of, for example, about one pound is poured into the propulsion section 20' through the opening in the outlet nozzle 24'. The nozzle plug 72' is then inserted in the opening in the outlet nozzle and the ring 71 is positioned to engage the grooves 320 in each of the fins. Then the fins are folded upwardly so that the upper end of each of the fins nests in its respective bracket 318 and the propellant filling and nozzle sealing means is securely held in sealing engagement with the outlet nozzle 24'. While holding the fins in the upwardly folded position, the rocket is placed in the lowermost section of the launching tube assembly 38' so that the lowermost portion of the stem 308 of the propellant filling and nozzle sealing means projects through the opening 144' at the lower end of the housing 44'. As a safety measure, the upper sections of the launching tube are then attached to the lowermost section 40' prior to pressurizing the propellant section 20' of the rocket. The cap 96' is removed from the stem 308 and the flexible conduit 214' is coupled to the stem.

The pressure regulator 208' is set for about 600 pounds per square inch and the valves 210' and 311 are manually opened to pressurize the rocket to about 500 pounds per square inch.

When the propulsion section 20' is charged to the desired pressure, the valve 210' is closed and the pressure is bled from the flexible filling line 214' and the coupling 350 is removed from the stem portion 308 of the propellant filling and nozzle sealing means 72'. The cap 96' is replaced on the stem. The quick release valve 148' is closed and the release arm 154' is latched in the closed position by the latch arm 166' as illustrated in FIG. 13 of the drawings. The intermediate pressure reservoir 194' is then pressurized to about 200 pounds per square inch by opening the valve 204' and charging the container 194' with carbon dioxide from the carbon dioxide storage container 202'. While the intermediate pressure reservoir 194' is being filled, the low pressure reservoir 190' is also being filled to approximately 20 pounds per square inch via the pressure reducing valve 198' and conduit 196'. When the launching containers 194' and 190' are filled, the valve 204' is closed and the rocket is ready for launching. Launching is accomplished by grasping and pulling the handle 345 of the flexible cable 180' to overcome the tension in the spring 174' whereby the latch arm 166' is urged downwardly releasing the pin 156'. With the pin 156' released, spring 162' urges the valve actuating handle 154' to the valve open position. Opening of the valve 148' admits gaseous carbon dioxide under about 20 pounds per square inch from the low and intermediate pressure reservoirs 190', 194' into the housing 44' at the lower end of the launching tube assembly via conduit 46'. The sudden release of the gaseous carbon dioxide into the housing 44' accelerates the rocket 12' and as the rocket leaves the launching tube assembly 38', the propellant filling and nozzle sealing means 28' is unlatched from the lower end of the outlet nozzle 24' and the pressure of the propelling charge within rocket section 20' propels the rocket on its flight.

*Rocket Recovery Device and Timing Mechanism Therefor*

Referring particularly to FIGS. 3, 12, 22, 23, 24 and 25, where the rocket of the invention is to be re-used or carries instrument packages which are to be recovered, the center section 18 of the rocket houses rocket recovery means which in the illustrated form of the device includes a parachute indicated at 440 in FIG. 22 with the lanyard 442 of the parachute attached at 444 to an opening provided in one of the ribs 122 of the top 30 of the propellant charge containing section 20 of the rocket. The recovery section 18 includes a removable panel or door 446 which extends between the upper portion of the dome 30 of the propellant charge containing section 20 and a ring member 248 which separates the recovery section 18 from the nose section 16. The ring member 248 is employed as a means for securing the shells of the recovery and nose sections together.

Within the shell or wall of the recovery section 18 is a vertically extending wall 449 which supports the door latch control and timing mechanism generally designated 450 and separates this mechanism from the parachute storage area. Opposite the wall 449 the compartment 18 is provided with a member 452 which extends the length of the recovery section 18 and is shaped to provide an internal hinge piece 454. One edge of the door 446 is shaped to provide an internal hinge piece 454. One edge of the door 446 is shaped to provide the cooperating hinge piece 456 while adjacent the other edge 458 of the door 446 there is provided a keeper plate 460 having a bore 462 therein. The opening 462 in the keeper plate 460 is adapted to receive a latch pin 464. The latch pin 464 is shown in the door latching position in FIGS. 22 and 23 of the drawings and it will be seen that a spring 466 acting between a ferrule 468 carried by a portion of the latch bar 464 and a plate 470 bent from a portion of the partition 449 urges the latch bar 464 in the door latching position.

A small opening 272 illustrated in FIGS. 3 and 22 of the drawings is provided in a wall of the recovery section 18 to permit the insertion of a manual door-opening implement. The manual door-opening implement engages the lower portion 474 of the latch bar 464 and urges the bar downwardly against the tension of spring 466 whereby the bar is withdrawn from the opening 462 in the latch plate 460 and the door 446 may be removed from the recovery section for repacking or insertion of the recovery parachute 440.

In operation of the rocket, the latch pin 464 is withdrawn from the latch or keeper plate 460 by an automatic timing mechanism generally referred to with the reference numeral 450. The latch pin withdrawing mechanism includes a conventional train of gears 476, 478, 480, 482 and 484, all more clearly shown in FIG. 23.

The first gear 476 of the gear train is connected to a shaft 486 which shaft cooperates with a conventional convoluted spring type motor 488. The extended end of the shaft 486 is adapted to receive the spring motor winding key and the shaft is accessible through a further opening 290 provided in the wall of the recovery section 18. The lowermost gear 484 engages a conventional escapement mechanism 492 provided with a pair of opposed weights 494 carried on opposite wings of the escapement arm. One of the weights is engaged by a bracket 496 forming a part of plate 498 mounted on side wall 500 of the timing mechanism 450. The plate 498 is slidably mounted to the side wall 500 by means of slotted opening 502 and the cooperating pin 504. When the plate 498 is in the upwardly extended position as illustrated in FIGS. 23 and 25, the arm 496 engages the escapement weight 494 and prevents movement of the timing mechanism.

The sliding plate 498 is provided with a further arm 506 which arm is provided with a bore 508 therethrough. The bore 508 receives one end of a rod 510, the other end of which is secured to a boss 512 formed from a portion of the wall 449. Slidably mounted on the rod 510 is a weight 514. The weight 514 is normally maintained in a position out of engagement with the arm 506 by a helical spring 516, the lower end of which engages a groove 518 in the upper end of the weight 514 and the other end 520 of the spring 516 is attached about the boss 512.

The plate 498 is also provided with an arm 522 and cooperating spring and when shaft 486 is rotated clockwise for winding the spring motor arm 522 is engaged by a small pin 524 secured to the winding shaft 486 of the timing mechanism which urges the sliding plate 498 upwardly to positively stop the actuation of the spring operated timing gear train mechanism and thereby set the timing mechanism in a ready position. After the timer has been actuated by weight 514 and plate 498 is moved downward, the arm 522 and its cooperating spring permit pin 524 to return past the catch as the timer motor unwinds.

The other wall 526 of the timing mechanism slidably carries a plate 528 in a guide bracket 530. The upper end of the plate 528 cooperates with a cam 532 secured to rotate with shaft 486 of the timing mechanism, whereby upon actuation of the timing mechanism, the surface 534 of the cam plate 532 engages the top surface 536 of the slide plate 528 and urges the plate downwardly.

The lower end of the slide plate 528 is bent inwardly and passes through a slotted opening 538 with the most inward end 540 engaging the extended end 542 of the latch bar 464 whereby downward movement of the slide plate 528 withdraws the latch pin 464 from the opening in the latch plate 460 whereby the door 446 will be forced open by the pressure of the packed parachute after which the parachute 440 is swept from the recovery compartment 18. The door of the recovery compartment may be attached to the parachute by a fine lanyard to permit recovery of the door along with the rest of the rocket.

The timing mechanism 450 is actuated by launching of the rocket 12. The rapid acceleration of the rocket 12, as it is launched from the launching tube, causes the weight 514, normally prevented from making contact with the boss or arm 506 of the timing mechanism, to strike the arm 506, and force the plate 498 downwardly whereby the arm 496 at the lower end of the plate is moved out of engagement with the weight 494 of the escapement mechanism 492. With the escapement mechanism free, the timing cycle begins to function and the door 446 is opened when the cam surface 534 forces the latch bar 464 out of engagement with the latch plate 460. It has been found that very satisfactory operation is provided where the weight 514 is about 5 grams. However, it will be appreciated that weight of the timer starting mechanism is determined in part by the smoothness of operation of the sliding plate 498 and the acceleration imparted to the rocket as it is launched from the launching tube.

Figure 27:
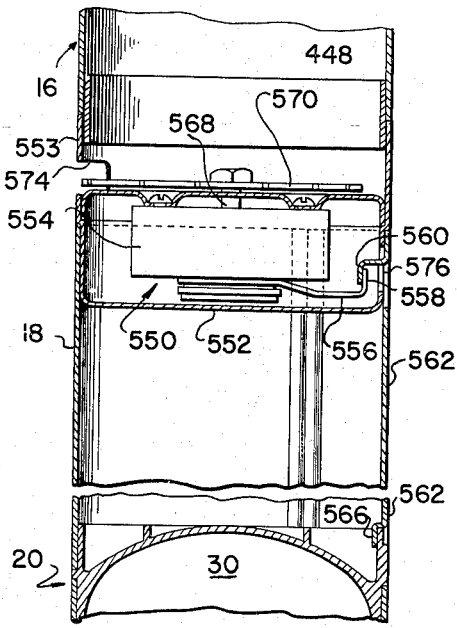
FIG. 27 is a sectional view substantially on line 27—27 of FIG. 26.
Figure 28:
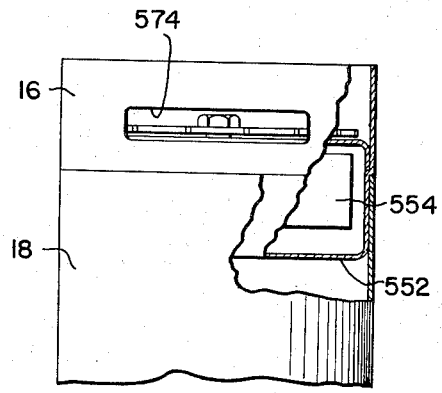
FIG. 28 is a fragmentary view of the opposite side of the structure shown in FIG. 26 with portions broken away to more clearly illustrate the positioning of the timing mechanism carried thereby.
Figure 29:
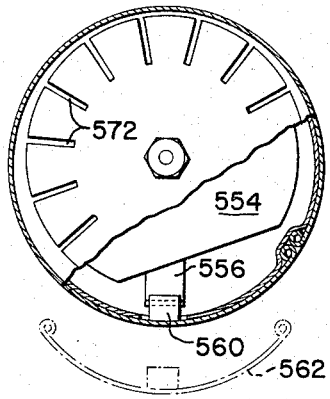
FIG. 29 is a fragmentary sectional view substantially on line 29—29 of FIG. 26.

In FIGS. 26, 27, 28 and 29, a further form of inertia-actuated timing mechanism for the recovery section is illustrated. In the form of the invention shown in FIGS. 26 through 29, the timing mechanism generally designated 550 is maintained in a cylindrical cup 552, the lower end of which is received in the recovery section shell. The upper end of the cup 552 receives a coupling 553 which provides the means for securing together shell sections 16 and 18 of the rocket.

In this form of the invention, a spring motor actuated timing gear train similar to that illustrated in FIGS. 22 through 25 is mounted in a timer housing 554. The timer is adapted to urge latch arm 556 downward and the latch arm is provided with an upstanding end 558 which engages a cooperating boss 560 carried by the door 562 whereby the downward movement of arm 556 releases the door 562 at its upper end. The lower end of the door 562 is provided with one or more depending bosses 566 which engage the upper edge of the cast head 30 dividing the propellant containing chamber and the recovery chamber 18. The latch arm 556 may be mounted to rotate with one of the shafts of the timing gear train whereby upstanding end 558 is rotated out of engagement with the boss 560 carried by the door 562 upon actuation of the timing gear train.

The timing gear train, not shown, is started by an inertial device consisting of a weight normally maintained out of engagement with a starting lever by resilient means as described with reference to the form of the timing mechanism shown in FIGS. 22 through 25.

The timer 550 is provided with a winding shaft 568, which shaft has secured for rotation therewith a circular winding disc 570. The disc 570 is notched as illustrated at 572 or provided with some form of indicia to indicate the amount of movement of the winding disc 570 required to set the timer for the desired period of time between actuation of the inertial timer starting means and release of the door 562 to the recovery compartment 18.

Access to the winding disc 570 is through an elongated opening 574 in the cup 352. It will be particularly noted from FIG. 29 of the drawings that the timer mechanism housing 554 is eccentrically mounted in cup 552 whereby the winding disc 570 is readily accessible for winding and setting the timer through the arcuate opening 574 in the cup 552. It will also be particularly noted that an opening 576 is provided in the door 562 and in the cup 552 to permit manual actuation of the door release latch 558.

In the plural forms of the door release means for the recovery section 18, the respective doors extend only throughout the recovery section. It will be apparent, however, that the releasable doors may extend into a portion of the nose section 16 of the rocket to provide exposure of the instruments carried therein to the atmosphere where such exposure is necessary for the proper operation of sensing and/or collecting devices.

It will further be apparent to those skilled in the art that where, for example, a humidity sensing mechanism and/or a temperature sensing element are carried by the rocket, that either opening of the recovery section door or movement of elements in the timing mechanism may be employed to bring about movement of the sensing elements or the like from a retracted storage position within the nose 16 to an extended position outside of the shell of the nose section of the rocket. Further release of the door of the recovery stage may also release an antenna for transmission of radio signals back to ground stations.

From the foregoing detailed description of the improved air traveling reaction propelled device and launching means therefor, it will be seen that the aims and objects of the invention have been fully accomplished. While particular embodiments and methods of operation of the present invention have been disclosed for purposes of illustration, various modifications may be made in the form of the rocket and the launcher therefor without departing from the scope of the invention as defined in the appended claims.

This application is a continuation-in-part of our application Serial No. 71,101 filed November 22, 1960.

We claim:

1. An air traveling reaction propelled device and a launcher therefor comprising a rocket having a body portion adapted to receive a propellant composition, an outlet nozzle at one end of the body and communicating therewith, outlet nozzle sealing plug means, a launching tube adapted to slidably receive the rocket body adjacent the outlet nozzle, releasable means maintaining the sealing plug means in the nozzle sealing position, said releasable means including releasable latch means cooperating with the sealing plug means and with said launching tube to maintain the sealing plug means in sealed relation with the outlet nozzle when the rocket body is received within the launching tube and to release the sealing plug means when the rocket is launched from the launching tube, and means for propelling said rocket from the launching tube.

2. An air traveling reaction propelled device and a launcher therefor comprising a rocket having a body portion, a pressure fluid propelling composition maintained in the body portion, an outlet nozzle at one end of the body and communicating therewith, outlet nozzle sealing plug means for the outlet nozzle to maintain the pressure fluid propelling means in the body portion, a launching tube adapted to slidably receive the rocket body adjacent the outlet nozzle, releasable means maintaining the sealing plug means in the nozzle sealing position, said releasable means including releasable latch means cooperating with the sealing plug means and with said launching tube to maintain the sealing plug means in sealed relation with the outlet nozzle when the rocket body is received within the launching tube and to release the sealing plug means when the rocket is launched from the launching tube, and means for propelling said rocket from said launching tube.

3. The invention defined in claim 2 wherein the pressure fluid propellant composition consists of carbon dioxide dissolved in acetone and maintained under pressure in said body portion by said sealing plug means for the outlet nozzle.

4. An air traveling reaction propelled device and a launcher therefor comprising a rocket having a body portion adapted to receive a propellant composition, an outlet nozzle at one end of the body and communicating therewith, outlet nozzle sealing plug means, a launching tube adapted to slidably receive the rocket body, releasable means maintaining the sealing plug means in the nozzle sealing position, said releasable means including releasable latch means cooperating with said launching tube and said sealing plug means to maintain the sealing plug means in sealed relation with the outlet nozzle when the rocket body is received within the launching tube and to release the sealing plug means when the rocket is launched from the launching tube, a plurality of stabilizing fins carried by the outlet nozzle, said stabilizing fins having a folded position whereby the rocket may be inserted in the launching tube, and an extended flight stabilizing position, resilient means associated with said fins and normally urging said fins into the extended position, and means for propelling said rocket from the launching tube.

5. The invention defined in claim 4 wherein said resilient means comprises a resilient band encircling said stabilizing fins above the pivotal connection of the fins to the outlet nozzle.

6. An air traveling reaction propelled device and a launcher therefor comprising a rocket having a body portion adapted to receive a propellant composition, an outlet nozzle at one end of the body and communicating therewith, sealing means for the outlet nozzle, a launching tube adapted to slidably receive the rocket body adjacent the outlet nozzle, said sealing means including a plug adapted to be snugly received in the outlet opening, latch means cooperating with the outlet nozzle and the inner wall of the launching tube and maintaining the sealing plug in sealed relation with the opening in the outlet nozzle, said latch means including a pair of arm members pivotally mounted to said sealing plug and foldable about the outlet nozzle, each of said arm means having launching tube wall engaging portions adapted to maintain the nozzle plug in the nozzle sealing position when the launching tube engaging portions are in contact with the walls of said launching tube, and means for propelling said rocket from the launching tube.

7. The invention defined in claim 6 wherein the means for propelling the rocket from the launching tube comprises a source of pressure fluid and quick acting valve means connecting said source of pressure fluid to the lower end of said launching tube.

8. The invention defined in claim 7 wherein said source of pressure fluid comprises compressed carbon dioxide.

9. In an air traveling rocket, a body portion adapted to receive an expansible propellant composition, an outlet nozzle at the lower end of the body portion and communicating with the propellant composition in said body portion, outlet nozzle sealing plug means, a launching tube adapted to slidably receive the rocket body adjacent the outlet nozzle, releasable means maintaining the sealing plug means in the nozzle sealing position, said releasable means including releasable latch means cooperating with the sealing plug means and with said launching tube to maintain the sealing plug means in sealed relation with the outlet nozzle when the rocket body is received within the launching tube and to release the sealing plug means when the rocket is launched from the launching tube, and means for propelling said rocket from the launching tube.

10. In an air traveling rocket, a body portion adapted to receive a compressed solution of carbon dioxide in acetone, an outlet nozzle at the lower end of the body portion communicating with the compressed solution of carbon dioxide and acetone, and releasable sealing means for said outlet nozzle and maintaining the compressed solution of carbon dioxide and acetone in said body portion until launching of said rocket, a launching tube in which said body portion, nozzle and sealing means are slidably disposed, and latch means connected to said nozzle and slidably disposed within said tube maintaining said sealing plug means in sealed relationship with the outlet nozzle, and means for propelling said rocket from said launching tube and for releasing said sealing plug means.

11. The invention defined in claim 10 wherein said latch means comprises a plurality of arm members pivotally connected at one end to said nozzle and having their other end slidably engaging the inner surface of said tube.

12. The invention defined in claim 10 wherein a plurality of stabilizing fins are pivotally connected to said nozzle, and means are provided to urge said fins in an extended stabilizing position upon launching of said rocket from said tube, including a resilient band disposed in notches in said fins forward of the point they are pivotally connected to said nozzle.

13. An air traveling reaction propelled device and a launcher therefor comprising a rocket having a body portion adapted to receive a propellant composition, an outlet nozzle at one end of the body and communicating therewith, outlet nozzle sealing plug means, a launching tube adapted to slidably receive the body portion adjacent the outlet nozzle, releasable means maintaining the sealing plug means in the nozzle sealing position, said releasable means including releasable latch means cooperating with the sealing plug means and with said launching tube to maintain the sealing plug means in sealed relation with the outlet nozzle when the rocket body is received within the launching tube and to release the sealing plug means when the rocket is launched from the launching tube, wherein said releasable latch means includes a plurality of flight stabilizing fins pivotally mounted adjacent the lower end of the outlet nozzle to move from an upwardly folded position to a downwardly extending flight stabilizing position, and means on at least some of said fins for engaging said sealing plug means when said fins are in the upwardly folded position.

14. An air traveling reaction propelled device and a launcher therefor comprising a rocket having a body portion adapted to receive a propellant composition, an outlet nozzle at one end of the body and communicating therewith, a plurality of fins pivotally mounted adjacent the lower end of the outlet nozzle for movement from an upwardly folded position to a downwardly extending flight stabilizing position, sealing means for the outlet nozzle, a launching tube adapted to slidably receive the rocket body when the pivotally mounted fins are upwardly folded, a groove provided in each of said fins, latch means carried by the sealing means for the outlet nozzle, said latch means adapted to be received in said grooves in each of the fins to maintain the sealing means in the outlet nozzle when the fins are maintained in the upwardly folded position by the launching tube, and means for propelling said rocket from the launching tube.

15. The air traveling reaction propelled device defined in claim 14 wherein said latch means comprises a ring carried by said sealing means and engageable with the grooves in each of said fins.

16. An air traveling reaction propelled device and a launcher therefor comprising a rocket having a body portion, said body portion adapted to receive a propellant composition in the lower end thereof, an outlet nozzle at the lower end of the body and communicating with the propellant composition, rocket recovery parachute timing means provided in the upper portion of said body, sealing means for the outlet nozzle, a launching tube adapted to slidably receive the rocket body adjacent the outlet nozzle, latch means cooperating with said launching tube and said outlet nozzle and maintaining the sealing means in sealed relation with the outlet nozzle, means for propelling said rocket from the launching tube, and inertial means responsive to said means for propelling said rocket from said launcher tube for actuating said timing mechanism.

References Cited in the file of this patent

UNITED STATES PATENTS

| | | |
|---|---|---|
| 1,879,840 | Brandt | Sept. 27, 1932 |
| 2,645,999 | Bogard | July 21, 1953 |
| 2,690,124 | Melick | Sept. 28, 1954 |
| 2,733,699 | Krinsky | Feb. 7, 1956 |
| 2,821,924 | Hansen et al. | Feb. 4, 1958 |
| 2,927,398 | Kaye et al. | Mar. 8, 1960 |
| 2,943,417 | Greenspan et al. | July 5, 1960 |